[12] United States Patent  
Gifford et al.

(10) Patent No.: US 7,092,774 B1  
(45) Date of Patent: Aug. 15, 2006

(54) MULTI-CHANNEL AUDIO PROCESSING SYSTEM WITH REAL-TIME PROGRAM DURATION ALTERATION

(75) Inventors: Christopher Scott Gifford, Nipomo, CA (US); Leonard Keith Moeller, Santa Clara, CA (US)

(73) Assignee: Prime Image, Inc., San Jose, CA (US)

( * ) Notice: Subject to any disclaimer, the term of this patent is extended or adjusted under 35 U.S.C. 154(b) by 0 days.

(21) Appl. No.: 09/516,303

(22) Filed: Feb. 29, 2000

(51) Int. Cl.
  *G06F 17/00* (2006.01)
  *G10L 21/00* (2006.01)
(52) U.S. Cl. .................... 700/94; 704/503; 704/504
(58) Field of Classification Search ................. 463/36, 463/35; 386/54, 96, 99; 375/240.26, 240.01, 375/240; 348/439.1, 384.1; 700/94; 381/14, 381/18, 307, 21–23; 704/503, 504
  See application file for complete search history.

(56) References Cited

U.S. PATENT DOCUMENTS 4,464,784 A    8/1984  Agnello ........................ 381/61
4,757,540 A *  7/1988  Davis .......................... 704/278
5,023,888 A *  6/1991  Bayston ....................... 375/239
5,627,581 A *  5/1997  Kondo ...................... 348/14.13
5,995,153 A * 11/1999  Moeller et al. ......... 375/240.01
6,026,232 A *  2/2000  Yogeshwar et al. .......... 345/719
6,178,317 B1* 1/2001   Kroeger et al. ............. 455/296

* cited by examiner

*Primary Examiner*—Huyen Le
*Assistant Examiner*—Andrew C. Flanders
(74) *Attorney, Agent, or Firm*—Stallman & Pollock LLP

(57) ABSTRACT

The total running time of an original multi-channel program signal is altered to generate a time-shortened (or time-lengthened) program signal. The original program signal may be thought of subdividable into a sequence of program signal portions, each program signal portion being further subdividable into a sequence of signal windows. Differencing circuitry determines, for each program siganl portion, a difference value indicative of a best differnce match between an initial signal window in that signal portion and subsequent signal windows in that signal portion in accordance with a predefined criterion. Removal circuitry then deletes from the original multi-channel program signal a multi-window segment of that signal portion, the deleted segment beginning with the initial signal window and ending with the subsequent signal window that generated the best difference match.

19 Claims, 4 Drawing Sheets

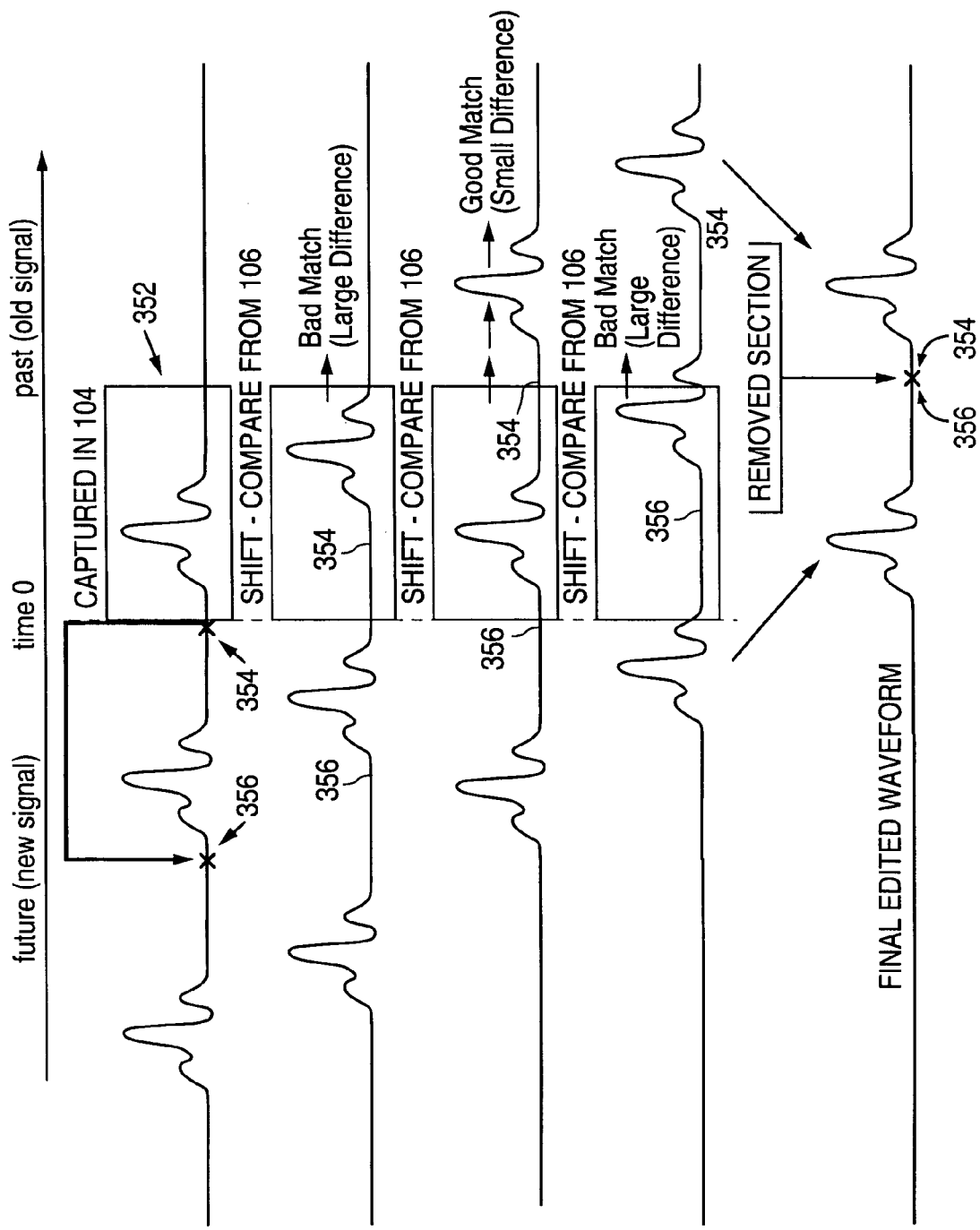

MULTI-CHANNEL AUDIO PROCESSING SYSTEM WITH REAL-TIME PROGRAM DURATION ALTERATION

TECHNICAL FIELD

The present invention relates to systems operable in real-time to alter the running time of a program signal and, in particular, to a system particularly suited to operate on multi-channel audio program signals.

BACKGROUND

It is known in the art to reduce the running time of a broadcast program signal by removing segments of the signal from the program in a manner that minimizes the impact on the viewer. For example, an apparatus sold commercially under the name "the TIME MACHINE" is available from Prime Image, Inc. of San Jose, Calif., for accomplishing this result. The Time Machine is sold primarily for use in the television industry and is particularly suited to reducing the running time of audio-visual programs to create additional commercial time. The TIME MACHINE removes redundant video signal from a broadcast signal by identifying and removing video segments in which there is little or no relative motion. The TIME MACHINE also removes corresponding audio signal by identifying appropriate "splice points" in the audio signal while keeping the audio signal within an acceptable synchronization of the corresponding video signal.

While the video signal reduction techniques utilized in the TIME MACHINE are quite advanced, the audio signal reduction technique is relatively rudimentary. For example, while the audio component of a program may be in two or more channels, the TIME MACHINE reduces the audio signal by analyzing only one channel of the stereo signal. (Similarly, U.S. Pat. No. 4,463,784, titled "Pitch Change with Glitch Minimizer," also analyzes only a single audio channel, and does not appear to even consider how to analyze and process multi-channel signals.) When the TIME MACHINE identifies signal suitable for removal in the one audio channel being analyzed, it removes corresponding material in the other audio channel with complete disregard for its audio content. This almost certainly would not be acceptable when the audio is contained in a large number of channels, such as in high-definition television (HDTV) which has six channel surround sound. Furthermore, even for the one audio channel that is analyzed, the algorithm employed by the TIME MACHINE for analyzing this channel is fairly static and cannot adapt to changing conditions in the audio signal.

SUMMARY

The present invention provides a technique for altering the total running time of an original multi-channel program signal to generate a time-shortened (or time-lengthened) program signal. The original multi-channel program signal may be thought of as subdividable into a sequence of program signal portions, with each signal portion being further subdividable into a sequence of program windows. In accordance with the invention, differencing circuitry determines, for each program signal portion, a difference value indicative of a best difference match between an initial signal window in that signal portion and subsequent signal windows in that signal portion in accordance with a pre-defined criterion. Removal circuitry then deletes from the original multi-channel program signal a multi-window signal segment of the signal portion, the deleted segment beginning with the initial signal window and ending with the subsequent signal window that generated the best difference match for that signal portion.

For a fuller understanding of the nature and advantages of the present invention, reference should be made to the following detailed description, considered in conjunction with the accompanying drawings.

BRIEF DESCRIPTION OF FIGURES

FIG. 3 illustrates, in a simplified manner, the operation of the differencing block 100 of FIG. 1.

DETAILED DESCRIPTION

Figure 1A:
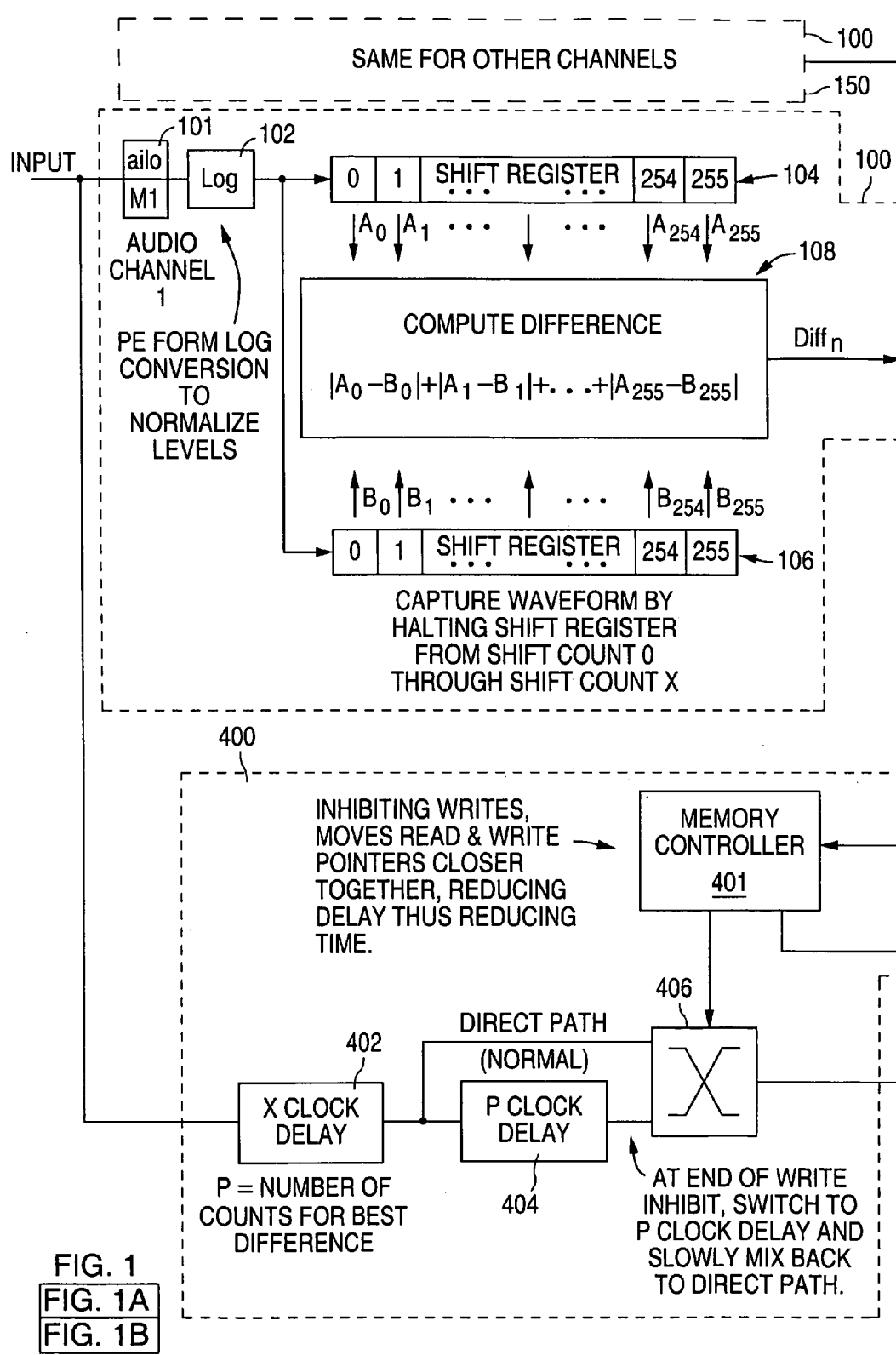
FIG. 1 is a block diagram illustrating an improved system for removing redundancies in a multi-channel signal in accordance with an embodiment of the present invention.
Figure 1B:
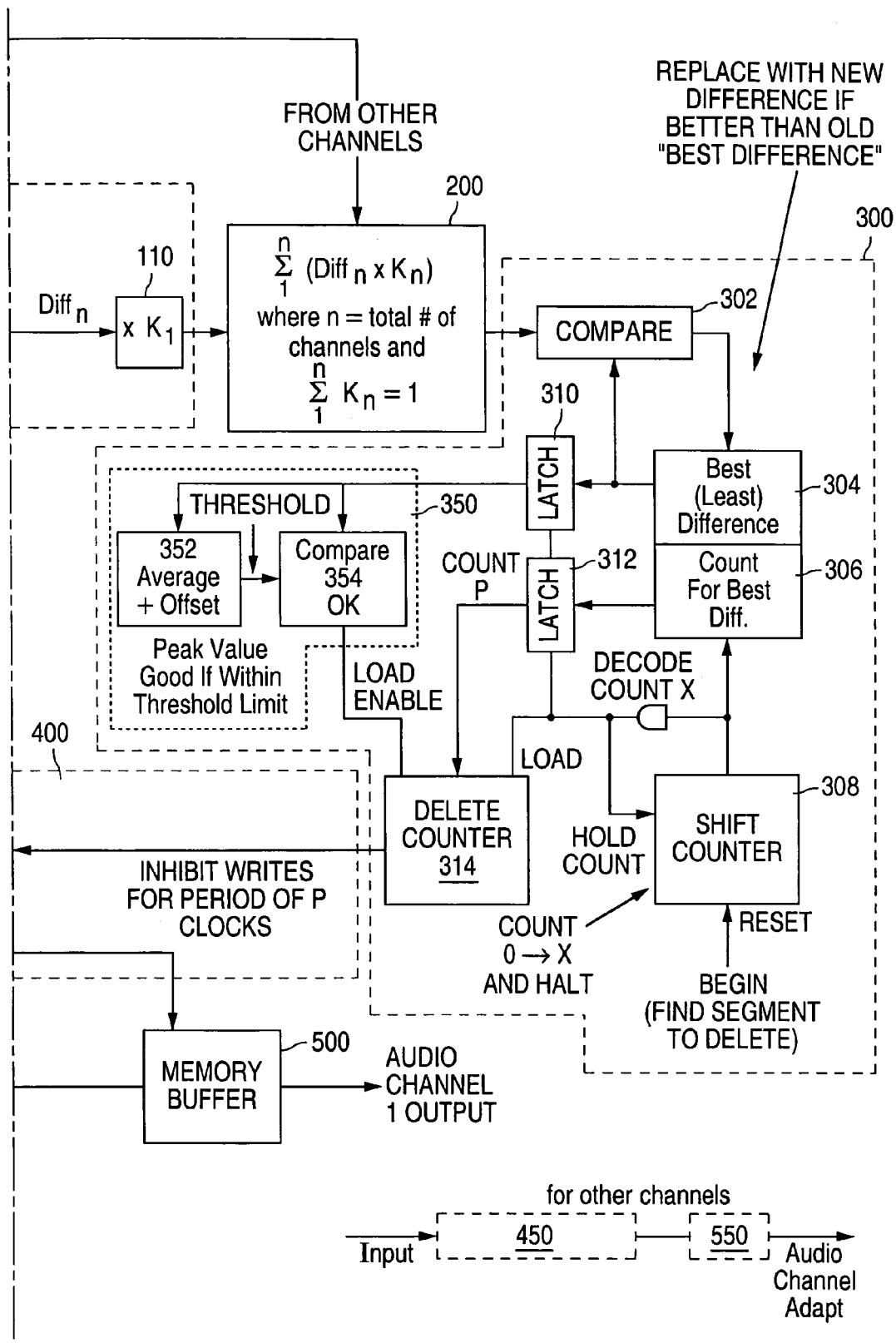

FIG. 1 shows a system for reducing the running time of a multi-channel program signal in accordance with the present invention. While the FIG. 1 system is described below in terms of audio signals, it should be noted that the system need not be limited to use in processing audio signals.

Referring to FIG. 1, a differencing block 100 determines a difference value indicative of the difference between various "windows" (defined below) of one channel signal of the multi-channel signal. As shown in FIG. 1, differencing blocks (designated by reference numeral 150) are provided for other channels of the multi-channel signal, although not necessarily for all of the other channels.

The differencing block 100 for one channel signal of the multi-channel signal includes two shift registers 104 and 106 to which the channel signal is provided via an "auto-null" circuit 101 and a normalization circuit 102.

The auto-null circuit 101 corrects for a slight DC bias in the input signal that is introduced by the analog to digital converter used to convert the "real-world" incoming analog signal into digital form for processing. To correct for the bias, the auto-null circuit 101 includes a low-pass filter that removes all frequencies from the input signal except DC and then subtracts this DC offset from the input signal.

The normalization circuit 102 next, in the illustrated embodiment, performs a logarithmic conversion on the channel signal, which now has the DC offset removed, to normalize the levels of the channel signal. That is, with the logarithmic conversion, the low levels in the channel signal are raised up, while the high levels in the channel signal are brought down. Thus, the logarithmic conversion tends to de-emphasize, but certainly not eliminate, information about the signal's amplitude; it also allows the resulting signal to be represented in a smaller number of bits without losing any important information. Thus, the circuitry that processes the signal can be simplified because it only needs to process a smaller number of bits.

The normalized channel signal output from the normalization circuit 102 is provided as an input both to the first shift register 104 and to the second shift register 106. Then, the contents of the first shift register 104 are held while the input channel signal is shifted through the second shift register 106 for a "compare period." A shift counter 308, shown at the lower right corner of FIG. 1, is incremented at each shift of the input channel signal through the second shift register 106. In one embodiment, the shifting into the shift registers 104 and 106 is at 48 kHz and the compare period is fixed at 32 ms (1,536 clock cycles at 48 kHz). The size of the compare period was chosen in this embodiment to be 32 ms because this is long enough to remove low frequency components, but not too long such that, for example, entire syllables or words of spoken language would be lost.

At each subsequent shift of the input channel signal through the second shift register 106 during the compare period, the differencing circuit 108 determines an absolute difference value between the held window of the input channel signal in the first shift register 104 and the subsequent windows of the input channel signal being shifted through the second shift register 106. (As the input channel signal is being shifted through the second shift register 106, the group of samples of the input channel signal in the second shift register 106 is referred herein as a "window" of the input channel signal for that time period of the input channel signal represented by the data in the second shift register 106. It should be understood that, for the other channels of the multi-channel signal, there is a corresponding window for each of those channels for the particular time period. Furthermore, the corresponding windows for the channels of the multi-channel signal for a time period are collectively referred to as the window of the multi-channel signal for that time period.)

In one embodiment, the absolute difference is determined by shifting the samples into a single subtraction circuit at 256 times the input channel sampling rate (e.g., at 256 times 48 kHz), computing each subtraction at the 256× rate, taking the absolute value of each subtraction and adding the absolute values for all 256 subtractions. In this way, only one subtraction circuit is required. In other embodiments, the 256 component differences are computed substantially concurrently, using 256 subtractions circuits at or near the input channel sampling rate. Of course, some hybrid between one subtraction circuit and 256 subtraction circuits may be also employed.

Some discussion of the choice of the 256-cell size for comparison is warranted at this point. The width of 256 was chosen to achieve an adequate sample that is representative of the signal and provides overall good matches. If fewer cells are used, then poor matches may result when the signal is complex. If the window is too wide, then a more exact match is required (which may not always occur.) Using 256 cells results in a 5.33 ms width at 48 KHz. The lowest frequency of interest would generally be 30 Hz, and 5.33 ms is approximately ⅙ of the period of 30 Hz. This sample is adequate to find a reasonable matching slope at 30 Hz but, in general, nothing smaller should be used.

Furthermore, speech has approximately 3 KHz of bandwidth, and 5.33 ms can contain sixteen cycles at 3 KHz. This should provide a very accurate match for the complexities of speech. With respect to music, much of the content is at 10 KHz to 20 KHz, at which 5.33 ms can contain 50 to 100 cycles, respectively. Finding an exact match of a complex signal in this frequency range is becoming difficult. Finally, 256 cells was chosen because of its even binary relationship, resulting in a simplified circuit design.

However computed, the difference value determined by the differencing circuit 108 for a particular window of the input channel signal is provided to a weighting circuit 110. The weighting circuit 110 multiplies the determined difference value for the window of the input channel signal by a weighting factor $K_1$ for that channel. (In one embodiment, the sum of the weighting factors for corresponding windows of all the channels is "1".) In a simple embodiment, the weighting factors may be equal for each channel of the input channel signal. For example, for a two-channel signal, the weighting factor may be set to ½ for each signal. In more complex embodiments, the weighting factor may be adjusted based on a determination of how significant the signals of the various channels are, the determination being made statically or even dynamically.

In any event, the weighted determined difference values for the corresponding windows of all the channels are combined by a difference value combining circuit 200 to determine an overall difference value for that window of the multi-channel signal. Then, the removal control circuit 300 evaluates the difference values provided by the difference combining circuit 200 for the various windows of the multi-channel signal and determines which window of the multi-channel signal compares most favorably with the window of the multi-channel signal collectively held in the first shift registers 104 of the differencing blocks 100 and 150. In some embodiments, the comparison for a first number of shifts (where the number is either fixed or is programmable) is either not performed or is discarded on the assumption that these signals will almost always be closest and that it is generally desirable to splice based on a best match of a relatively low frequency component within the window. The lowest frequency component will not generally be repeated within the window of the initial shifts. Put another way, if the first comparison results were considered, then it is likely that only small amounts of input signals would be discarded for each window.

Figure 2:
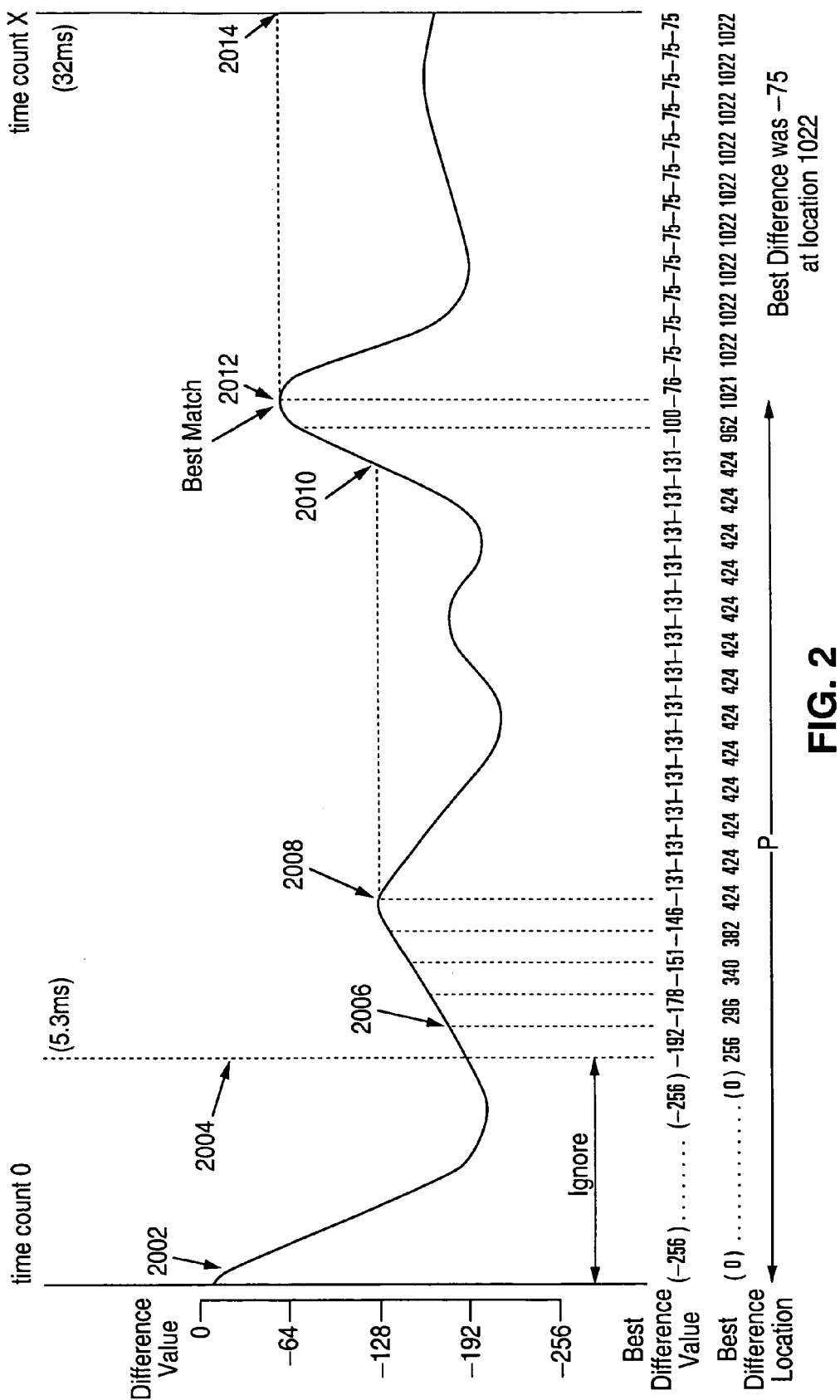
FIG. 2 illustrates an example output of the difference value combining circuit 200 of FIG. 1.

A compare circuit 302 included within the removal control circuit 300 compares the new difference value provided by the difference combining circuit 200 for a particular window to the previous best difference, stored in a best difference memory 304, determined for previous windows of the same sample. If it is determined that the new difference is better than the previous best difference, then the new difference is stored into the best difference memory 304. In addition, the "count" for that window (i.e., number of shifts from the beginning of the window) to which the new "best difference" corresponds is stored into the count memory 306 from the shift counter 308. This process of determining the "best difference" for a particular window is illustrated in FIGS. 2 and 3 and is discussed in greater detail below.

At the end of the compare period (using the example discussed above, at the end of 1536 compares), the best difference is provided from the best difference memory 304 to a threshold checking circuit 350 via a latch 310. The threshold checking circuit 350 regulates the assertion of a load enable signal to a delete counter 314 to control the circumstances under which the count for "best difference" is loaded into the delete counter 314 from the count memory 306 via the latch 312. As is discussed below, the delete counter 314 generates an "inhibit signal" that is used by a signal remover circuit 400 to control which segment of the multi-channel signal is removed.

Turning back to the threshold checking circuit 350, this circuit checks the ultimate "best difference" value for each compare period to ensure that, even though it is the "best difference" for the particular compare period, it is a good enough "best difference" to warrant deleting the signal segment that corresponds to that "best difference". In one embodiment, an "average plus offset" circuit 352 computes a running average of previous "best difference" values (e.g., by discarding the highest and lowest values and taking a mean of the remaining values) and combines the computed average with an offset "tolerance" value. If the current "best difference" value is determined by the compare circuit 354 to be at least as good as the running average within the offset "tolerance", then the load enable signal is asserted. There is a realization, however, that, in this embodiment, acceptable "best difference" values may be ignored while the running average adjusts, for example, to sudden changes in amplitude of the input signal.

The latch 312 contains the count (location) for "best difference" at the completion of the compare period. If the "best difference" value meets the requirements of the threshold circuit 350, then the count value from the latch 312 is loaded into the delete counter 314.

It should be noted that, in some embodiments, there is more processing to determine whether to delete a particular segment of audio other than just the threshold. For example, past performance of successful deletions may be considered before the threshold circuit 350 is allowed to prevent a deletion. That is, with each deletion prevented (due to not meeting the threshold), the offset value is changed to make it easier to delete at the next comparison. Eventually, if deletions are still being prevented by the threshold circuit 350, then the threshold circuit 350 is disabled and the "best difference" value is used without regard for threshold.

This threshold lowering (and eventual disabling) is done to regulate the tempo of the signal. If signal segments are removed at a periodic rate, then the tempo of the signal (e.g., if it is music) will speed up by some amount. If segments are suddenly prohibited from being deleted, then there will be a sudden change in the tempo of the signal. This will be more noticeable than if a "bad edit" is allowed to occur.

In one embodiment, and for one example condition, the threshold circuit 350 is controlled in this way such that one segment is "dropped" each second. This condition is maintained even though there is generally a capability to drop segments 20 times per second. Thus, if a "drop" is prevented by the threshold circuit 350 because of a bad threshold, then there are still 19 more chances that second to find a drop that meets the threshold. If no good matches are found over the next 19 attempts, then the threshold circuit 350 would be disabled so that the drop rate can be kept at approximately 1 per second.

In addition to varying the threshold, more drastic means may be employed if the deletion rate is not occurring fast enough. This usually only occurs when the performance is being "pushed" beyond what is considered "normal" reduction times, or if the input signal is very complex. If the controller begins to detect that not enough signal is being dropped for it to succeed in dropping the requested amount of time for the entire program, then it first lowers the threshold. If this still does not allow a "catch up", then the comparison time is varied. For example, referring to FIG. 2, the "ignore period" (identified by reference numeral 2004) is varied between 5.3 ms and 27 ms. This should have the effect of forcing a "best match" to occur at a larger distance from the compare "window", thus deleting a larger segment of the input signal. Once it is determined that the deletion is back on track, the adaptive features return to normal operation.

Another adaptive means may be used when the success rate of deletions is high. This usually occurs when very little reduction time is required, or when the input signal(s) is very simple. In this mode, the compare period reduces from the nominal 32 ms (in the disclosed embodiment) to something smaller. This forces smaller portions to be dropped, minimizing any possible distortions. For example, speech may be improved by not allowing whole syllables to be removed. It should be noted that this mode may not be successful if very low frequencies are present.

Returning to FIG. 1, when loaded, the delete counter 314 begins outputting an "inhibit" signal and continues to do so until the counter has counted down to zero. When the count reaches zero, the "inhibit" signal ends. The "inhibit" signal should match the timer period from the start of the compare period to the "best difference" match.

Before describing the signal remover circuit 400, the operation of the output buffer memory 500 will be discussed. The memory buffer 500 is controlled with a read pointer and a write pointer. Normally, the write pointer is at an address that is one location greater than the read pointer. Upon each clock cycle, the address pointers are incremented by one. As the pointer reaches the maximum address, it overflows to the zero address. In this configuration, the read output signal will be one clock delayed from the write input signal. If the difference between the read and write pointers is increased, then the delay of the output signal will also be increased.

At the start of the program, the write pointer is moved to an address greater than the read pointer by some amount. This will produce a time delayed output. The delay time should be equal to the amount of time that is desired to be removed. For example, if it is desired to shorten a program from 30 minutes to 25 minutes, then 5 minutes must be removed from the program. The delay time in such a case should be set to 5 minutes and the program begins at the output of the memory buffer 5 minutes after it entered the memory.

If the write pointer is now stopped (by a write inhibit signal), but the read pointer is allowed to continue incrementing through the memory, two things happen. First, information at the input is not being written into the memory and, thus, is deleted from the program. Second, the read pointer gets closer to the write pointer location. Thus, the delay from output to input is reduced when writing is resumed. The output is always producing data even though the input is being halted.

The process of inhibiting the write pointer is repeated over the course of the program until the delay is finally back to one clock (minimum). This results in a program which has been time reduced.

At the beginning of an identified program, when the process is started, no output signal will be present. The output will not occur until the delay time of the buffer has elapsed. During this initial time, other new program material may be used, such as an advertisement, while waiting for the delayed program to begin. It should be noted that this process happens in real time using a continuous input signal. It does not require any recording equipment for controlled playback.

The signal remover circuit 400 will now be described. Broadly speaking, the signal remover circuit 400 operates in response to the write inhibit signal from the removal control circuit 300 to control the writing of the multi-channel input signal to the output buffer memory 500 for output. That is, for a portion of the input signal that is determined to be suitable for deletion, the signal remover circuit 400 operates to inhibit writing into the output memory buffer 500 that portion of the signal to be deleted.

In the specific FIG. 1 embodiment, a first delay circuit 402, a second delay circuit 404 and a mixer 406 operate collectively to ensure as much as possible a smooth transition where a portion of the input signal is deleted. Referring to the signal remover circuit 400 block of FIG. 1, the first delay circuit 402 receives the input signal and delays it by "X" clock cycles, where "X" is nominally the number of clocks in the compare period (using the example above, 1,536 clocks.) then, a P clock delay circuit 404 further delays the input signal by P clocks, where P is the count for the "best difference" from the counter register 306, and provides the twice-delayed signal to a first input of a mixer circuit 406. The output of the first clock delay circuit 402 is also provided to a second input of the mixer circuit 406, without being delayed by the second delay circuit 404.

In one embodiment, the mixer 406 is controlled as follows. In a "normal mode" (non-inhibit), the mixer is configured for 100% of the direct path. When the inhibit signal occurs, the mixer is configured for 100% of the delayed (P clock delay) path. While the inhibit signal is active, no information is being written into the memory buffer 500. During this active inhibit time, the signal is propagating through the P clock delay 404. When the inhibit signal is removed, the output buffer memory 500 begins writing the signal from the P clock delay 404 through the mixer. For example, the signal coming into the X clock delay 402 is "n−2", "n−1", "n", "n+1", "n+2", . . . . If the last signal that was written into the output buffer memory 500 was sample "n" before the inhibit signal, then the first signal to be written into the output buffer memory 500 will be sample "n+1". Because the delay 404 has the same time delay as the inhibit signal, the output from the delay 404 after the inhibit signal should match the direct path before the inhibit signal. Over the course of the next 10.66 ms (where this "mixer edit time" was chosen to smooth out any mis-matched edit points over as long a time as possible, but without distorting the signal by taking "too long"), the mixer slowly moves from [100% delay (404)], [99% delay (404 and 1% direct], . . . [50% delay (404) and 50% direct], . . . , [0% delay (404) and 100% direct]. This produces a smooth edit around the deleted section. With this method, the center of the edit point is actually at the 50%/50% point and is late by 5.33 ms. To adjust for this, the X clock delay (402) is shorted by 5.33 ms. This way it begins 5.33 ms before the identified edit point, and is perfectly lined up with the edit point at the 50%/50% position.

The operation of at least a part of the FIG. 1 circuit may be better understood with the aid of FIG. 2. The waveform 2002 illustrates the output of the difference value combining circuit 200. As discussed above, the comparisons by the compare circuit 302 for a first number of shifts may not be performed or are discarded. This "first number of shifts" is indicated in FIG. 2 by the dashed "ignore" line 2004 at 5.3 ms into compare period. These comparisons are not performed or are discarded on the assumption that the differences of the first several shifts will almost always be closest, that it is generally desirable to discard based on a best match of a relatively low frequency component within the compare period, and that the lowest frequency component will not be repeated within the period of the initial shifts.

After the time period indicated by the dashed line 2004 is passed, then the present difference value is compared by the comparison circuit 302 with the previous "best difference" value and, if the present difference value is better than the previous "best difference" value, then the present difference value is stored into the best difference register 304 as a new "best difference" value. For example, at point 2006 (the time for the first difference value not ignored or discarded), that first difference value will always be set to the "best difference" value because there are no previous "best difference" values. Then up until point 2008, each succeeding difference value is better than the previous "best difference" value and, thus, replaces the previous "best difference" value in the best difference register 304. From point 2008 to point 2010, each new difference value is not better than the previous "best difference" value stored in register 304 (from point 2008), so the value in register 304 is not changed. Then, from point 2010 to point 2012, each new difference value is better than the previous "best difference" value, so the value in register 304 is updated at each cycle to have the newest difference value. Then, from point 2012 to point 2014, the previous "best difference" value is best, so the value in register 304 is not updated.

FIGS. 3A–3D illustrate the operation of the differencing block 100 and the removal control circuit 300, ignoring for the moment that there are multiple input channels that have difference values that are weighted by the difference value combining circuit 200. FIG. 3A shows the section of the input signal captured by the first shift register 104, producing the first window 352 against which comparisons will be made. FIG. 3B shows that the input signal has been shifted into the second shift register 106, producing another window. This window, when compared against the initial window 352, qualitatively, yields a "bad" (large) difference. FIG. 3C shows that the input signal has been shifted further into the second shift register 106, and now yields a "good" (small) difference. FIG. 3D shows that the input signal has been shifted yet more into the second shift register 106, and now yields a "bad" difference again. Based on all this, the write inhibit signal from the delete counter 314 is controlled to inhibit the input signal between points 354 (initial window time) and 356 (best match time) from being written into the output memory buffer 500. FIG. 3A shows the segment of the input signal, between points 354 and 356, that will be deleted. FIG. 3E shows the final waveform.

At the end of the X cycle window (32 ms in the FIG. 2 example), the signal occurring at the beginning of the window is now just emerging from the first delay circuit 402. Ignoring for the moment the effect of the second delay circuit 404 and the mixer 406, the signal delayed by the first delay circuit 402 is provided to the output memory buffer 500. However, for the number of clocks ("P") represented by the value in the delete counter 314, which, as discussed in great detail above, is indicative of the number indicated by the "count for best difference" in the delete period of time during which the signal has been determined to have a "best difference", the delayed input signal provided to the output memory buffer 500 is inhibited from actually being written into the output memory buffer 500. All the while, signal data continues to read out of the output memory buffer 500, so the memory 500 read pointer gets closer to the write pointer, thus reducing the amount by which the actual output signal is delayed from the actual input signals.

The previous discussion describes a process of reducing the time duration of a program. The process can be reversed to expand the time duration of a program. This is accomplished by replicating an identified time packet instead of deleting it.

While the foregoing provides a full and complete description of an embodiment of the present invention, various modifications, alternative constructions and equivalents may be employed, as desired. Therefore, the above description and illustrations should not be construed as limiting the scope of the invention, which is defined by the appended claims.

What is claimed is:

1. An apparatus that alters the total running time of an original multi-channel program signal that includes a plurality of individual channel signals, each individual channel signal being subdividable into a sequence of channel signal portions, each channel signal portion being subdividable into a sequence of channel signal windows, the apparatus comprising:

for each of two or more of the plurality of individual channel signals, a corresponding differencing circuit that receives said individual channel signal and determines, for each channel signal portion of said individual channel signal, a difference value indicative of a difference between a characteristic of an initial channel signal window in said channel signal portion and a characteristic of a subsequent channel signal window in said channel signal;

a difference value combining circuit that receives the difference values from each of the differencing circuits and combines said difference values to generate an overall difference value for a corresponding program signal portion of the multi-channel program signal; and a removal circuit that deletes from the original multi-channel program signal a multi-window segment that begins with the initial channel signal window and ends with the subsequent channel signal window.

2. An apparatus as in claim 1, and further comprising:

threshold checking circuitry that determines whether the overall difference value meets a threshold value, the removal circuit being enabled to delete the multi-window segment if the difference value meets the threshold value.

3. A method of altering the total running time of an original multi-channel program signal that includes a plurality of individual channel signals, each individual channel signal being subdividable into a sequence of channel signal portions, each channel signal portion being subdividable into a sequence of channel signal windows, the method comprising:

for each of two or more of the individual channel signals, determining, for each channel signal portion of said individual channel signal, a difference value indicative of a difference between a characteristic of an initial channel signal window in said channel signal portion and a characteristic of a subsequent channel signal window in said channel signal portion such that the difference value meets a particular criterion;

combining the difference value from the individual signal channels to generate an overall difference value for a corresponding program signal portion of the multi-channel program signal;

determining whether the overall difference value meets a predefined threshold; and in the event that the overall difference value meets the predefined threshold, deleting from the original multi-channel program signal a multi-window segment that begins with the initial channel signal window and end with the subsequent channel signal window; and wherein the determining step comprises:

for each of said two or more individual channel signals, providing said individual channel signal to first and second shift registers, the contents of the first shift register being held while the channel signal is shifted through the second shift register for a compare period;

incrementing a shift counter at each shift of the channel signal through the second shift register; and for each shift of the channel signal through the second shift register during the compare period, determining the difference value between the initial channel signal window of the signal portion of the channel signal held in the first shift register and subsequent channel signal windows of said signal portion being shifted through the second shift register.

4. An apparatus that alters the total running time of an original multi-channel program signal that includes a plurality of individual channel signals, each individual channel signal being subdividable into a sequence of channel signal portions, each channel signal portion being subdividable into a sequence of channel signal windows, the apparatus comprising:

for each of two or more of the individual channel signals, a differencing circuit that receives said individual channel signal and determines, for each channel signal portion of said individual channel signal, a difference value indicative of a difference between a characteristic of an initial channel signal window in said channel signal portion and a characteristic of a subsequent channel signal window in said channel signal;

a difference value combining circuit that receives the difference values from each of the differencing circuits and combines said difference values to generate an overall difference value for a corresponding program signal portion of the multi-channel program signal; and a removal circuit that deletes from the original multi-channel program signal a multi-window segment that begins with the initial channel signal window and ends with the subsequent channel signal window, and wherein each differencing circuit includes, first and second shift registers, each of which receives the associated individual channel signal as an input, the contents of the first shift register being held while the channel signal is shifted through the second shift register for a compare period;

a shift counter that is incremented at each shift of the channel signal through the second shift register; and difference computing circuit that, for each shift of the channel signal through the second shift register during the compare period, determines the difference value between the initial channel signal window of the signal portion of the channel signal held in the first shift register and subsequent channel signal windows of said signal portion being shifted through the second shift register, and for each differencing circuit, a weighting circuit that multiplies the difference value provided by the difference computing circuit by a weighting factor for the associated channel signal.

5. An apparatus as in claim 4, and wherein the weighting factor for at least one channel signal is different than the weighting factor of another channel signal.

6. An apparatus as in claim 4, and wherein the weighting factor is the same for each channel signal of the multi-channel program signal.

7. An apparatus as in claim 4, and wherein the weighted difference values from the weighting circuits are combined by the difference value combining circuit to determine the overall difference value for the corresponding signal window of the multi-channel signal.

8. An apparatus as in claim 7, and wherein the removal circuit includes a removal control circuit that evaluates the overall difference values provided by the difference value combining circuit for each of the signal windows of the signal portion being shifted through the second shift register during the compare period to determine a best difference value and a best difference memory element for storing the best difference value.

9. An apparatus as in claim 8, and wherein the removal control circuit includes a compare circuit that compares the overall difference value provided by the difference value combining circuit for a particular signal window of the channel signal portion being shifted through the second shift register to the previous best difference value determined by the removal control circuit and stored in the best difference memory element and that, if said overall difference value is better than the previous best difference value, replaces the previous best difference value stored in the best difference memory element with said new overall difference value.

10. An apparatus as in claim 9, and further comprising:
a count memory that stores the shift count value of the shift counter that is associated with the overall difference value of the signal window stored in the best difference memory element.

11. An apparatus as in claim 10, and wherein the overall difference value stored in the best difference memory element at the end of the compare period is provided to the threshold checking circuit.

12. An apparatus as in claim 11, and wherein, in the event that the overall difference value stored in the best difference memory element at the end of the compare period meets the predefined threshold, the removal circuit deletes from the original multi-channel program signal a multi-window segment that begins with the initial signal window and ends with the subsequent signal window corresponding to the signal window associated with the overall difference value stored in the best difference memory element at the end of the compare period.

13. A method of altering the total running time of an original multi-channel program signal that includes a plurality of individual channel signals, each individual channel signal being subdividable into a sequence of channel signal portions, each channel signal portion being subdividable into a sequence of channel signal windows, the method comprising:
for each of two or more of the individual channel signals, determining, for each channel signal portion of said individual channel signal, a difference value indicative of a difference between a characteristic of an initial channel signal window in said channel signal portion and a characteristic of a subsequent channel signal window in said channel signal portion such that the difference value meets a particular criterion;
combining the difference value from the individual signal channels to generate an overall difference value for a corresponding program signal portion of the multi-channel program signal;
determining whether the overall difference value meets a predefined threshold; and
in the event that the overall difference value meets the predefined threshold, deleting from the original multi-channel program signal a multi-window segment that begins with the initial channel signal window and end with the subsequent channel signal window, and
wherein the determining step comprises:
for each of said two or more individual channel signals, providing said individual channel signal to first and second shift registers, the contents of the first shift register being held while the channel signal is shifted through the second shift register for a compare period;
incrementing a shift counter at each shift of the channel signal through the second shift register; and
for each shift of the channel signal through the second shift register during the compare period, determining the difference value between the initial channel signal window of the signal portion of the channel signal held in the first shift register and subsequent channel signal windows of said signal portion being shifted through the second shift register, and
for each difference value, multiplying the difference value by a weighting factor for the associated channel signal.

14. A method as in claim 13, and wherein the weighting factor is the same for each channel signal of the multi-channel program signal.

15. A method as in claim 14, and wherein the weighted difference values are combined to determine the overall difference value for the corresponding signal window of the multi-channel signal.

16. An apparatus as in claim 15, and further comprising:
evaluating the overall difference values for each of the signal windows of the signal portion being shifted through the second shift register during the compare period to determine a best difference value and storing the best difference value in a best difference memory element.

17. A method as in claim 16, and comparing the overall difference value for a particular signal window of the channel signal portion being shifted through the second shift register to the previous best difference value stored in the best difference memory element and if said overall difference value is better than the previous best difference value, replacing the previous best difference value stored in the best difference memory element with said new overall difference value.

18. A method as in claim 14, and further comprising:
storing in a count memory the shift count value associated with the overall difference value of the signal window stored in the best difference memory element.

19. A method as in claim 18, and wherein, in the event that the overall difference value stored in the best difference memory element at the end of the compare period meets the predefined threshold, deleting from the original multi-channel program signal a multi-window segment that begins with the initial signal window and ends with the subsequent signal window corresponding to the signal window associated with the overall difference value stored in the best difference memory element at the end of the compare period.

* * * * *